US012532403B2

(12) United States Patent
Mysore Rajagopal

(10) Patent No.: US 12,532,403 B2
(45) Date of Patent: Jan. 20, 2026

(54) MINIATURIZED INTEGRATED CYCLOTRON

(71) Applicant: TEXAS INSTRUMENTS INCORPORATED, Dallas, TX (US)

(72) Inventor: Krishna Praveen Mysore Rajagopal, Manteca, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 42 days.

(21) Appl. No.: 18/385,721

(22) Filed: Oct. 31, 2023

(65) Prior Publication Data

US 2025/0142709 A1 May 1, 2025

(51) Int. Cl.

| | |
|---|---|
| ***H03H 7/18*** | (2006.01) |
| ***H03H 15/00*** | (2006.01) |
| ***H05H 7/18*** | (2006.01) |
| ***H05H 13/00*** | (2006.01) |
| ***H05H 15/00*** | (2006.01) |

(52) U.S. Cl.

CPC ............ *H05H 13/005* (2013.01); *H05H 7/18* (2013.01); *H05H 15/00* (2013.01)

(58) Field of Classification Search

None

See application file for complete search history.

(56) References Cited

U.S. PATENT DOCUMENTS

| | | | | |
|---|---|---|---|---|
| 5,521,469 A * | 5/1996 | Laisne | H05H 13/00 | 315/502 |
| 6,057,655 A * | 5/2000 | Jongen | H05H 13/00 | 313/62 |
| 8,525,448 B2 * | 9/2013 | Tanaka | H05H 13/02 | 315/501 |
| 8,822,965 B2 * | 9/2014 | Asaba | H05H 7/12 | 250/492.1 |
| 9,055,662 B2 * | 6/2015 | Kleeven | H05H 13/005 | |
| 9,894,747 B2 * | 2/2018 | Pärnaste | H05H 13/005 | |
| 10,136,508 B2 * | 11/2018 | Haberger | H05H 7/18 | |
| 10,850,132 B2 * | 12/2020 | Ebina | H05H 7/10 | |

(Continued)

OTHER PUBLICATIONS

PCT International Search Report; PCT/US2024/053213; mail date Feb. 17, 2025; 2 pages.

*Primary Examiner* — Kenneth B Wells

(74) *Attorney, Agent, or Firm* — Andrew R. Ralston; Frank D. Cimino

(57) ABSTRACT

An electronic device includes a first resonator electrode and a second resonator electrode in an interconnect stack over a semiconductor substrate. The first resonator electrode includes a first lower resonator electrode, a first upper resonator electrode and a first plurality of vias between the first lower resonator electrode and the first upper resonator electrode. The second resonator electrode includes a second lower resonator electrode, a second upper resonator electrode, and a second plurality of vias between the second lower resonator electrode and the second upper resonator electrode. A cavity in the interconnect stack is bounded by the first resonator electrode and the second resonator electrode. An electron emitter extends from the semiconductor surface between the first and second resonator electrodes and is configured to direct electrons into the cavity. The electronic device may be operated to produce short wavelength radiation, e.g. x-rays.

23 Claims, 14 Drawing Sheets

(56) References Cited

U.S. PATENT DOCUMENTS

| | | | | |
|---|---|---|---|---|
| 11,457,523 | B2 * | 9/2022 | Aoki | H05H 13/02 |
| 11,570,881 | B2 * | 1/2023 | Hae | H05H 13/00 |
| 2009/0218520 | A1 | 9/2009 | Nutt | |
| 2012/0037814 | A1 | 2/2012 | Lal | |
| 2016/0212834 | A1 | 7/2016 | Haberger | |

* cited by examiner

MINIATURIZED INTEGRATED CYCLOTRON

FIELD

This disclosure relates to the field of electronic devices, and more particularly, but not exclusively, to a compact integrated source of short-wavelength radiation.

BACKGROUND

Cyclotrons are typically used to produce short-wavelength optical radiation, e.g. x-rays, and are critical in many use contexts, such as medical imaging and security scanning. These devices are typically large and expensive, limiting their use and/or consuming scarce funding.

SUMMARY

The inventors disclose various devices and/or methods that may be beneficially applied to needs for short-wavelength optical radiation. While such implementations may be expected to provide various improvements, e.g. reduced size and cost of such radiation sources, no particular result is a requirement of the described invention(s) unless explicitly recited in a particular claim.

One example provides an electronic device which includes a first resonator electrode and a second resonator electrode in an interconnect stack over a semiconductor substrate. The first resonator electrode includes a first lower resonator electrode, a first upper resonator electrode and a first plurality of vias between the first lower resonator electrode and the first upper resonator electrode. The second resonator electrode includes a second lower resonator electrode, a second upper resonator electrode, and a second plurality of vias between the second lower resonator electrode and the second upper resonator electrode. A cavity in the interconnect stack is bounded by the first resonator electrode and the second resonator electrode. An electron emitter extends from the semiconductor substrate surface between the first and second resonator electrodes and is configured to direct electrons into the cavity. The electronic device may be operated to produce short wavelength radiation, e.g. x-rays.

Other examples include methods of forming an electronic device as described above.

DETAILED DESCRIPTION

The present disclosure is described with reference to the attached figures. The figures may not be drawn to scale and they are provided merely to illustrate the disclosure. Several aspects of the disclosure are described below with reference to example applications for illustration, in which like features correspond to like reference numbers. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events may be required to implement a methodology in accordance with the present disclosure.

A cyclotron is a device that accelerates charged particles in a curved, or circular, path determined in part by a magnetic field having an orientation directed at least partially out of the plane of the circular path. The accelerated charged particles emit photons, which may be short wavelength photons such as x-rays when the circular path has a sufficiently small radius. Short wavelength photons are useful for various purposes, including medical or industrial imaging, or security screening.

Various examples described herein and otherwise in the scope of the disclosure provide a miniaturized, integrated cyclotron that may be applied to various use cases in single or multiple units to provide an x-ray source with scalable brightness or flux. By use of various processes compatible with semiconductor manufacturing, such devices may be made for relatively low cost. While such embodiments may be expected to enable new classes of devices, such as hand-held x-way sources, no particular result is a requirement of the present invention unless explicitly recited in a particular claim.

Figure 1:
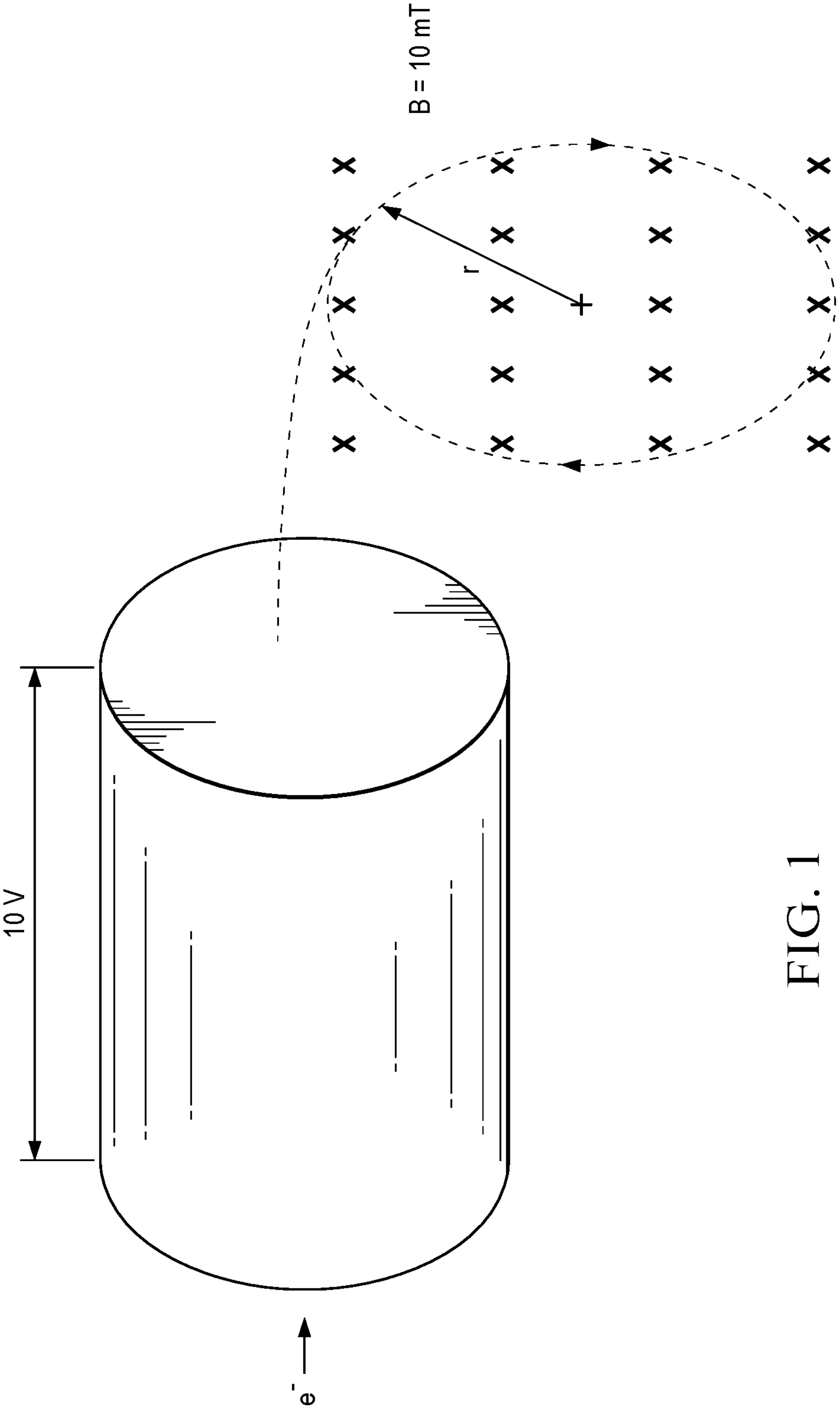
FIG. 1 schematically illustrates aspects of electron motion in a magnetic field.

FIG. 1 schematically illustrates an electron accelerated by a potential and constrained by a magnetic field denoted by “x” to travel in a circular path of radius r. In a nonlimiting example, the potential is 10 V and the magnetic field is 10 mT. Thus if the electron is initially at rest, it will have an energy of 10 eV when it enters the magnetic field.

The force on the electron is $$F_m = q(v \times B) = qvB \cdot \sin(\theta), \tag{1}$$

where q is the charge on the electron, v is the velocity,

B is the magnetic field strength, and

θ is the angle between the magnetic field vector direction of velocity of the electron.

When the angle between the magnetic field and the electron velocity is 90°, the force on the electron reduces to $$F_m = qvB. \tag{2}$$

Eq. 2 can be related to the centripetal force Fc on the electron as $$F_c = \frac{mv^2}{r}, \tag{3}$$

where m is the mass of the electron and r is the radius of the electron path. From Eq. 2 and Eq. 3, the radius of the electron path can be determined as $$r = \frac{mv}{qB}. \tag{4}$$

For the example in which the electron has an energy of 10 eV, and the magnetic field is 10 mT, the force exerted by the electric field (10 V) on the electron is equal to the kinetic energy gained by the electron, e.g.

$$F_s = q \cdot V = \frac{1}{2}mv^2. \tag{5}$$

The magnitude of the velocity of the electron can be determined from Eq. 5 to be $$v = \sqrt{2qV/m}. \tag{6}$$

Using well-known values of the mass and charge of an electron and a value of 10 V, the velocity is determined to be about 1.88 m/s. Referring to Eq. 4, the radius of the path of travel of an electron under these example conditions is about 1.07 mm.

In an oscillating condition, the angular frequency of the electron path may be equal to the frequency of an oscillator that imparts energy to the electron. The frequency may be expressed as $$f = \frac{qB}{2\pi m}, \tag{7}$$

and the kinetic energy $E_k$ of the electron may be determined to be $$E_k = \frac{q^2B^2r^2}{2m}. \tag{8}$$

Commercially useful photon energies may be in a range of 10 keV to 200 keV, for purposes such as, e.g. x-ray crystallography, mammography, medical CT (computed tomography) and airport security. According to Eq. 8, such energies may be provided using a magnetic field of 10 mT by an electron flight path radius in a range from about 0.5 mm to about 5 mm, easily provided by existing microelectronic and/or micro-electrical-mechanical systems (MEMs) processing technology.

Figure 2:
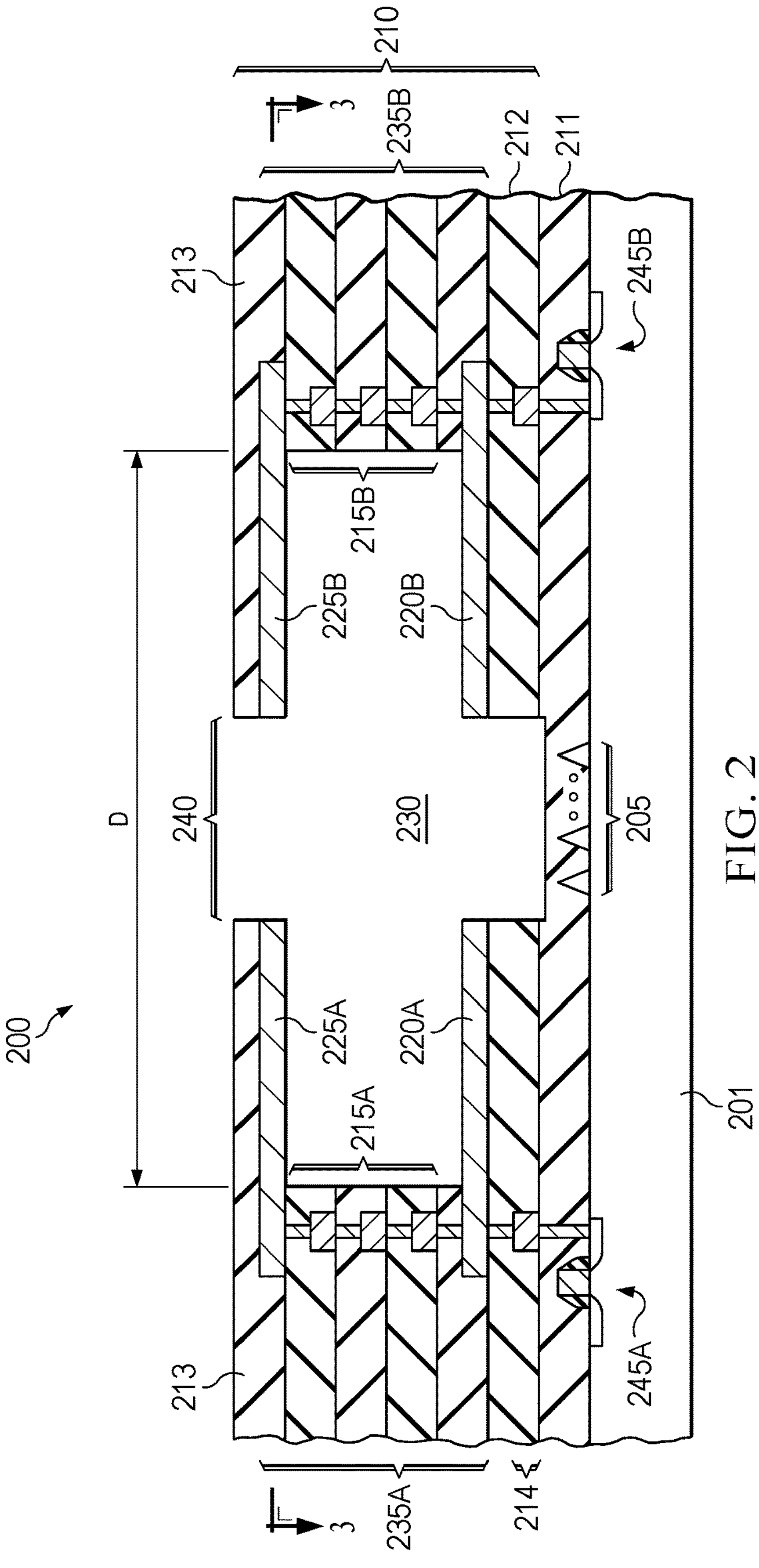
FIG. 2 shows an illustrative example of an electronic device configured to produce short wavelength radiation, e.g. x-rays.

FIG. 2 illustrates an electronic device 200 that may be used to generate commercially useful photons, e.g. x-rays. The electronic device 200 includes a semiconductor substrate 201, e.g. a silicon substrate. The semiconductor substrate 201 may include a portion of a base wafer and any layers over the base substrate, such as one or more epitaxial and/or doped layers. An electron emitter array 205 is formed over or into the semiconductor substrate 201. As described supra, the electron emitter array 205 includes one or more point electron emitter devices. An interconnect stack 210 overlies the semiconductor substrate 201. The interconnect stack 210 includes any number of metal or dielectric layers.

Metal layers may include aluminum or copper horizontal interconnect levels, and aluminum, copper or tungsten via/landing levels 215A/215B. Dielectric layers may include silicon oxide and/or silicon nitride and/or any other insulating materials to implement an interconnect stack that provides structures to implement a cyclotron according to the disclosure. The interconnect stack 210 includes a pre-metal dielectric (PMD) layer 211, an inter-metal dielectric (IMD) layer 212, and a top dielectric layer 213.

The interconnect stack 210 includes a first lower resonator electrode 220A and a second lower resonator electrode 220B, and a first upper resonator electrode 225A and a second upper resonator electrode 225B. The first lower resonator electrode 220A is conductively connected to the first upper resonator electrode 225A by vias/landing levels 215A, and the second lower resonator electrode 220B is conductively connected to the second upper resonator electrode 225B by vias/landing levels 215B. A cavity 230 defines a space between the lower resonator electrodes 220A/B and the upper resonator electrodes 225A/B and between the vias/landing levels 215A and the vias/landing levels 215B. A first driving electrode 235A may be defined as including the lower resonator electrode 220A, the upper resonator electrode 225A and the vias/landing levels 215A, and a second driving electrode 235B may be defined as including the lower resonator electrode 220B, the upper resonator electrode 225B and the vias/landing levels 215B. The driving electrodes 235A, 235B are separated by a gap 240 that extends into, and perhaps through, the PMD 211. The electron emitter array 205 is within the gap 240, and may be about centered between the driving electrodes 235A, 235B. The cavity 230 has a diameter D that may be designed consistent with an intended operating frequency, or wavelength, of the electronic device 200, e.g. in a range from about 0.5 mm to about 5 mm.

Transistors 245A and 245B are representative of any number of components configured to impart an alternating voltage on the first driving electrode 235A, and to impart an alternating voltage on the second driving electrode 235B. The transistors 245A and 245B are connected to the driving electrodes 235A, 235B by way of metal landing pads formed in a first metal level 214. The drive signals applied to the driving electrodes 235A, 235B are generally periodic, such as square wave, triangular wave or sine wave, and may have a constant non-zero difference in phase, for example 180° (π radians). The frequency of the drive signals is as described by Eq. 8.

Figure 3:
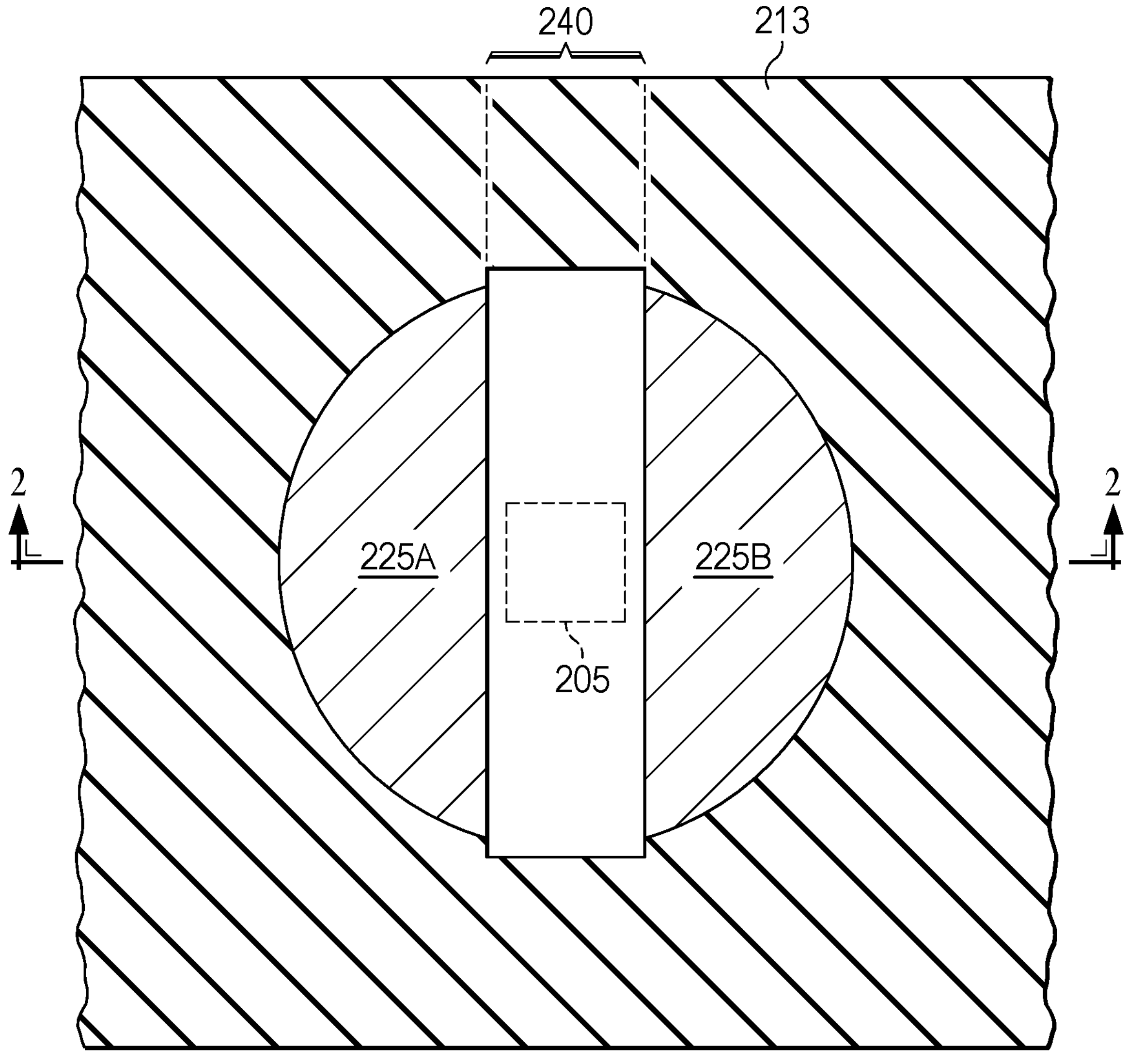
FIG. 3 shows a top view of the device shown in FIG. 2.

FIG. 3 provides a view of the device 200 as marked in FIG. 2 ("top-down"). In the illustrated example, the upper resonator electrodes 225A/B describe portions of a circle separated by the gap 240. For reference the electron emitter array 205 is shown within the gap 240. The upper resonator electrodes 225A/B may have a shape other than circle portions, such as each being rectangular. The lower resonator electrodes 220A/B may have a same shape and lateral extent as the upper resonator electrodes 225A/B, but this is not required.

Figure 4:
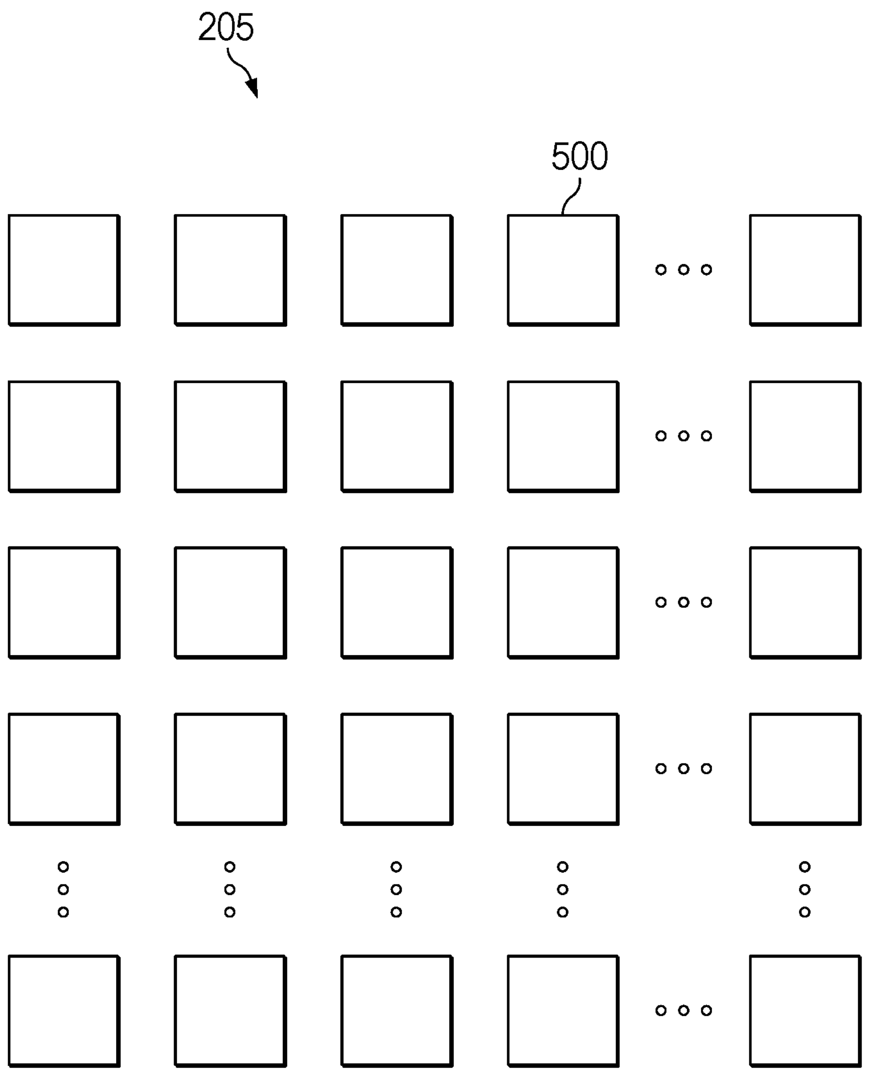
FIG. 4 illustrates an example array of electron emitters.

FIG. 4 shows an example of the electron emitter array 205 in greater detail. The electron emitter array 205 includes a number of individual emitters 500. In the illustrated example, the emitters 500 are arranged in a regular, e.g. evenly spaced, rectilinear array. While such an arrangement may be convenient for layout purposes, other arrangements are possible and within the scope of the disclosure. The number of emitters 500 is not limited to any particular value, and may be selected to meet various design considerations such as device size and/or total electron flux produced by the electron emitter array 205. In some examples, the electron emitter array 205 may include thousands of emitters 500. Generally the emitters 500 may be multiple instances of a same emitter device, though this is not a requirement.

Figure 5:
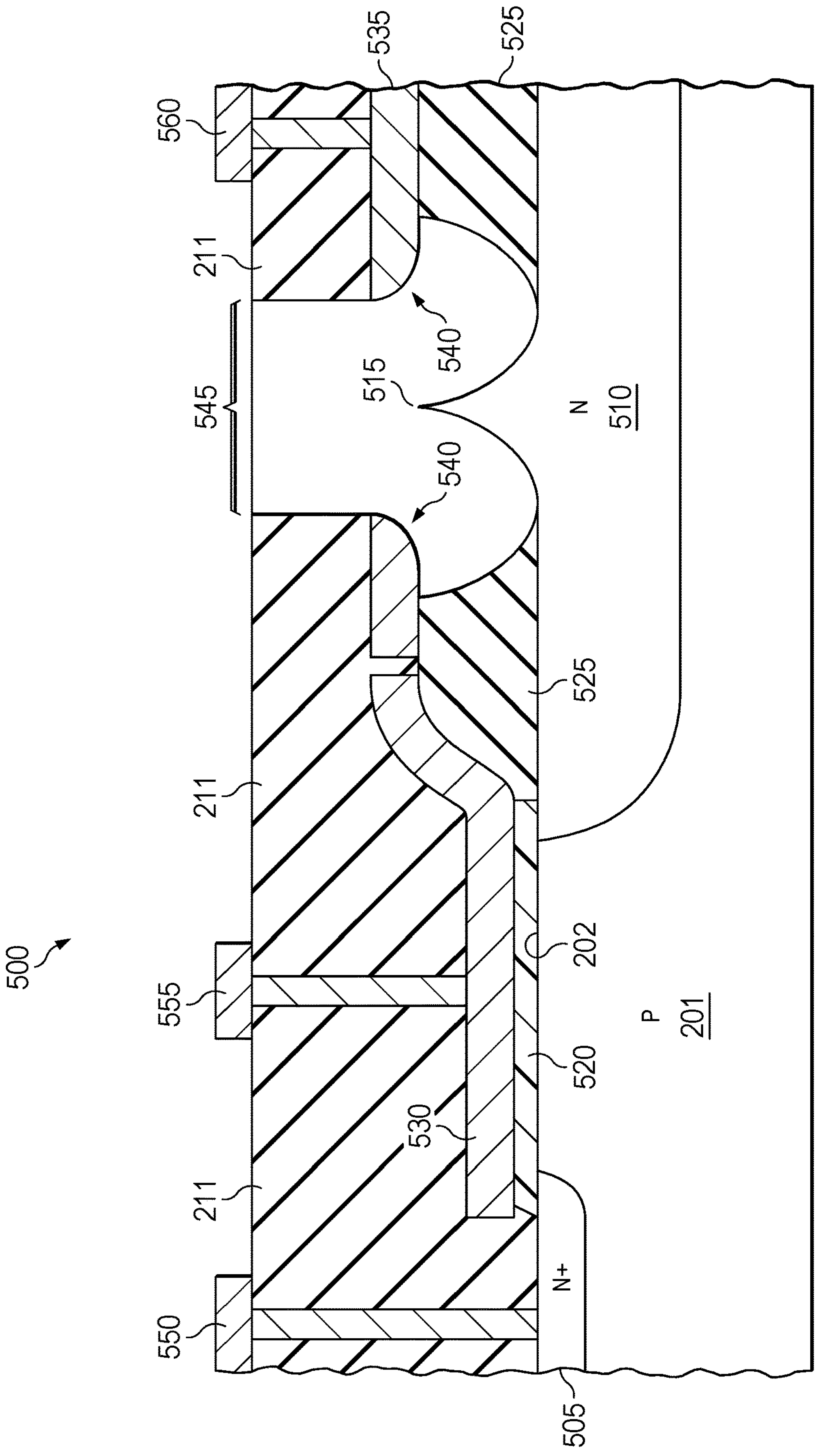
FIG. 5 shows an electron emitter according to one example.

FIG. 5 illustrates the emitter 500 according to one example. For convenience and without implied limitation, the emitter 500 is shown formed in and over the substrate 201 and including the PMD layer 211. In some examples, and in the currently described example, the substrate 201 is a p-type semiconductor, and may be a discrete layer over another semiconductor layer, such as a lightly doped p-type epitaxial layer over a portion of a bulk silicon wafer. A source region 505, e.g. N-type, extends into the substrate 201. The source region 505 region may be heavily doped. A drain region 510, e.g. N-type, extends into the substrate 201. The drain region 510 also extends above a top surface 202 of the substrate 201 to an emitter point 515. A dielectric layer includes a gate dielectric 520 and an emitter insulator 525. The emitter insulator 525 is removed in a perimeter around the emitter point 515. An electrode layer includes a gate electrode 530 and an emitter cathode electrode 535 conductively isolated from the gate electrode 530. An aperture 540 is formed in the emitter cathode electrode 535 around the emitter point 515. The electrode layer may be formed from a polysilicon layer or other suitable conductor. The PMD layer 211 covers the gate electrode 530 and the emitter cathode electrode 535, and includes an opening 545 coincident with the aperture 540.

An unreferenced via (or contact) connects the source region 505 to a first terminal 550. Another unreferenced via connects the gate electrode 530 to a gate terminal 555. And another unreferenced via connects the emitter cathode electrode 535 to an emitter cathode terminal 560. The terminals 550, 555 and 560 may be formed in the first metal layer 214. (FIG. 2.)

Additional details regarding the emitter 500 and its formation may be found in Hong, et al., "A silicon MOSFET/field emission array fabricated using CMP", *IVMC* 2001, *Proceedings of the* 14*th International Vacuum Microelectronics Conference* (Cat. No. 01TH8586), IEEE, 2001, incorporated herein by reference in its entirety.

Figure 6A:
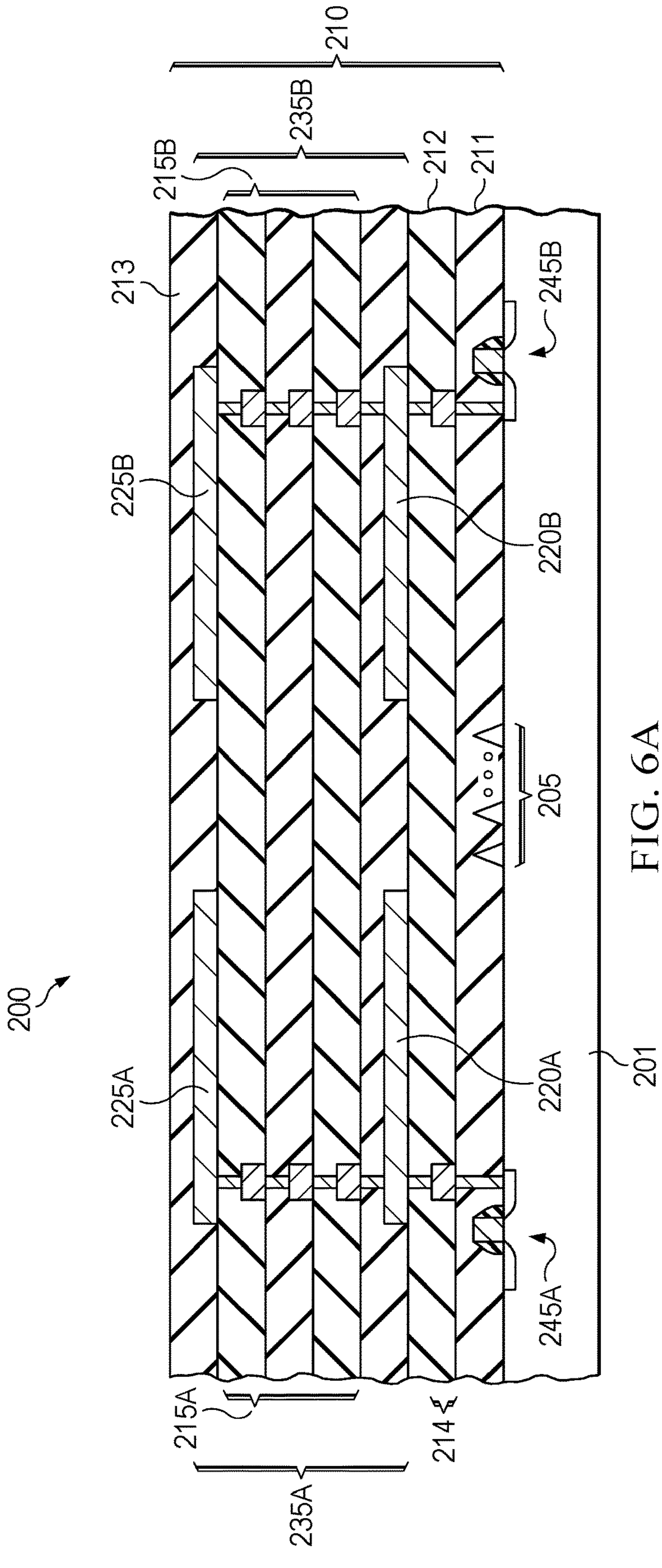
FIGS. 6A-6E illustrate several stages in an example manufacturing sequence to form an electronic device such as shown in FIG. 2.

FIGS. 6A-6E illustrate a process sequence that may be used to form the electronic device 200 according to various examples. FIG. 6A shows the electronic device 200 at an intermediate stage of manufacturing, at which the interconnect stack 210 has been formed over the substrate 201 and the emitter array 205. The interconnect stack may be formed by any one or more unit processes that are known or may be developed in the future.

Figure 6B:
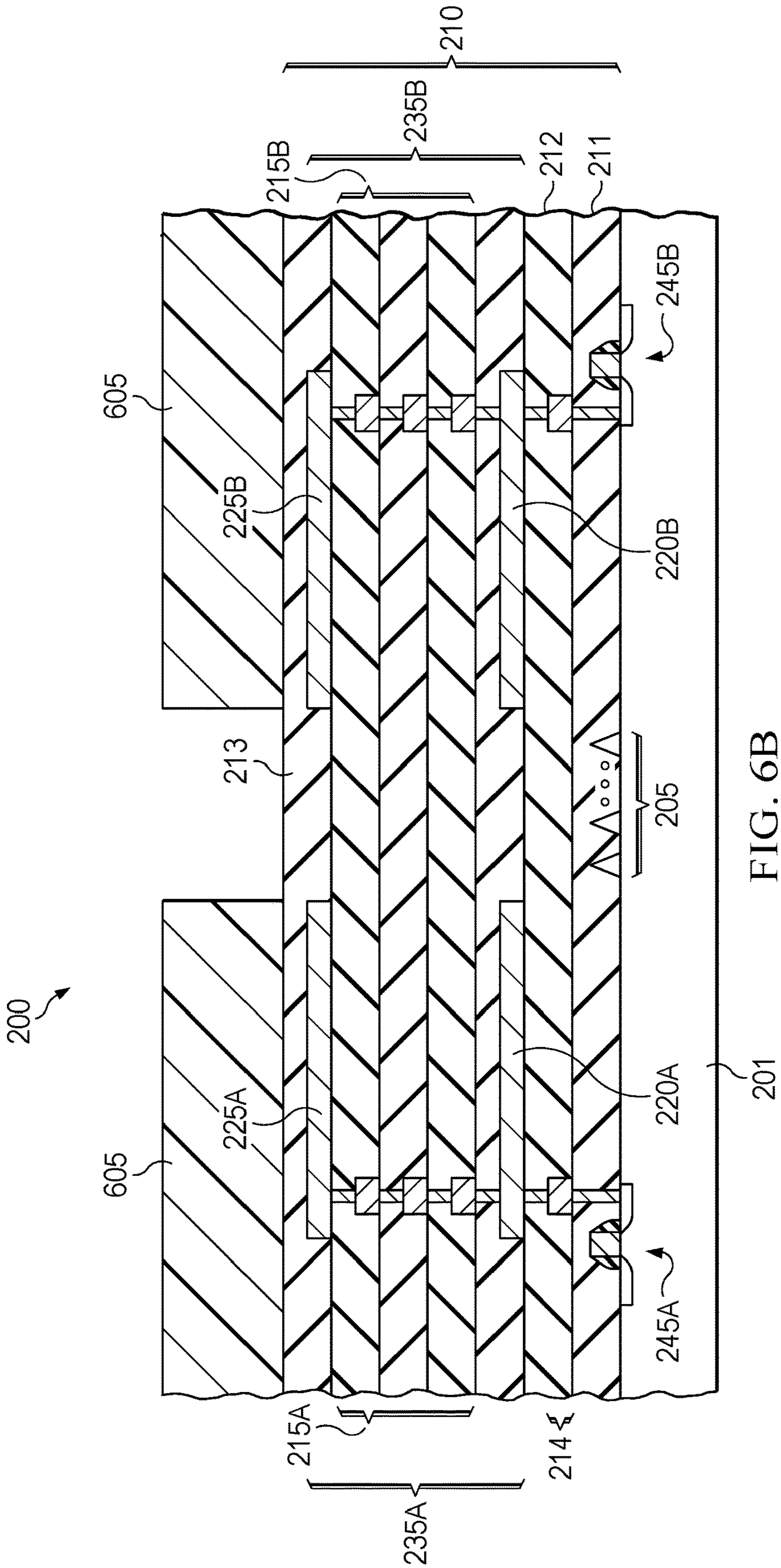

FIG. 6B shows the electronic device 200 after forming a resist layer 605 over the interconnect stack 210. The resist layer may be an organic photosensitive material, and has been exposed using a mask and developed to provide an opening over the emitter array 205.

Figure 6C:
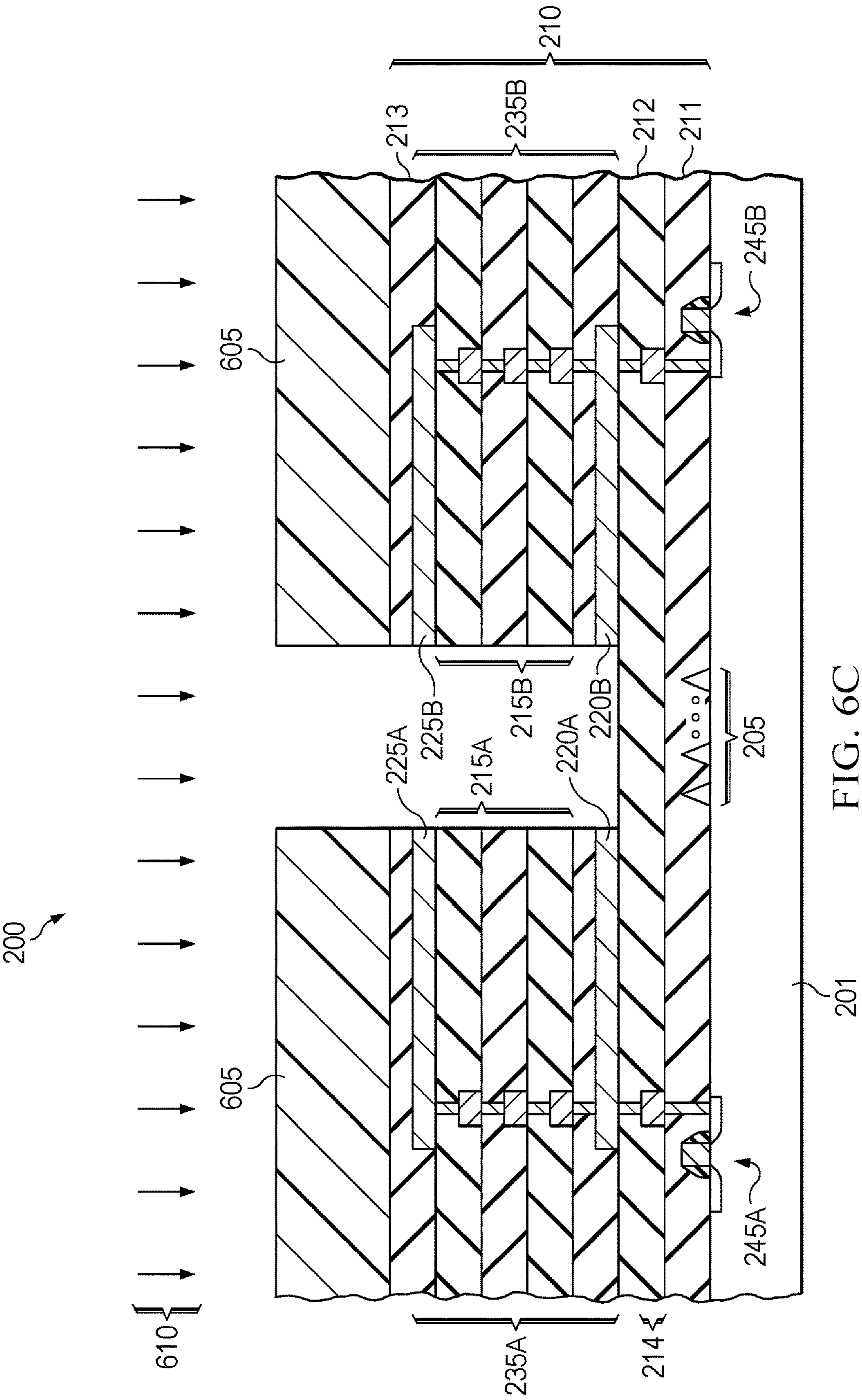

In FIG. 6C an etch process 610 has been used to remove portions of the dielectric layers of the interconnect stack 210. In the illustrated the dielectric layers are removed to about the level of the lower resonator electrodes 220A, 220B, though other etch depths may be used depending on the specific nature of a later wet etch process used to form the cavity 230.

Figure 6D:
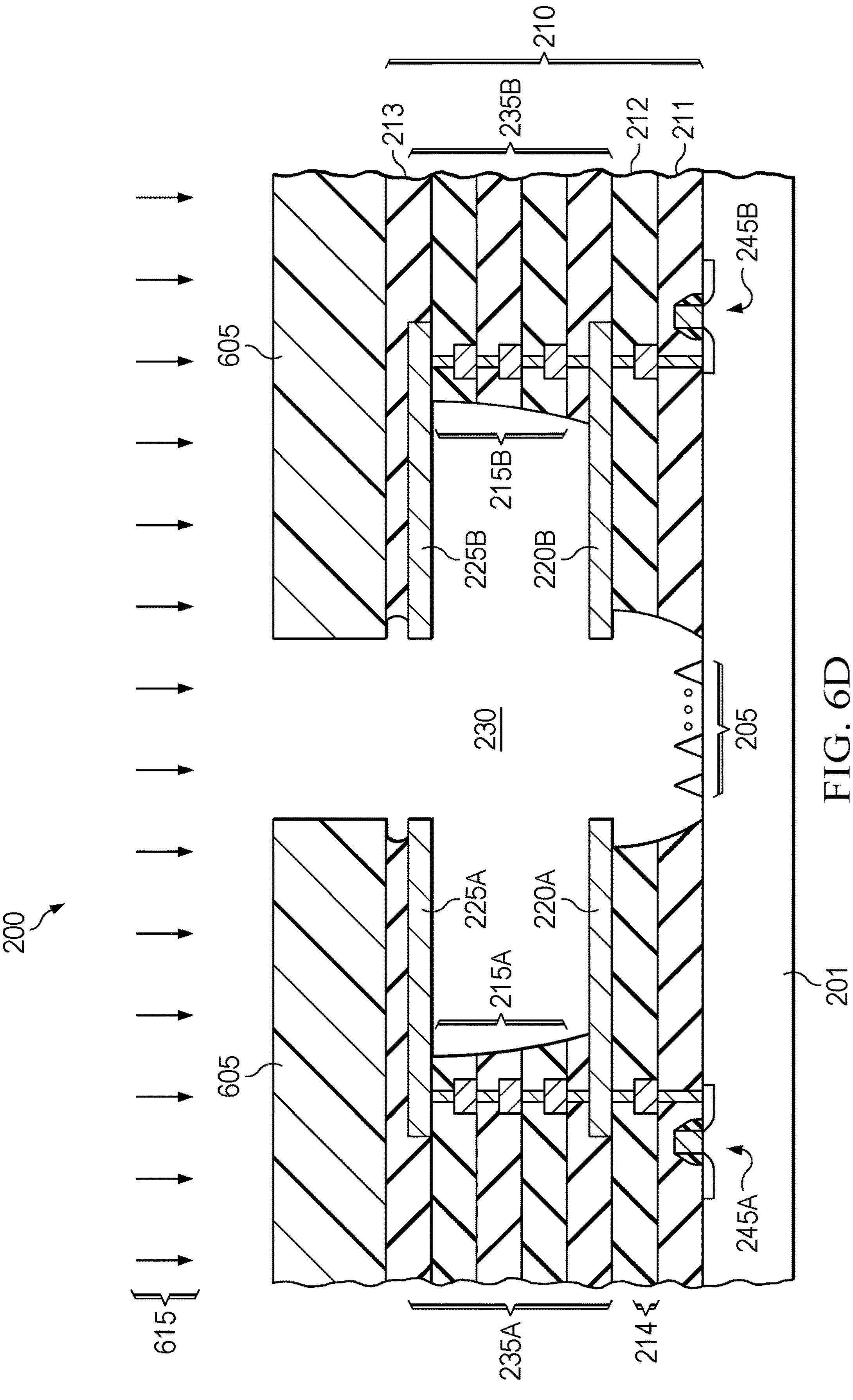

FIG. 6D illustrates the electronic device 200 after performing one or more wet etch processes 615 to remove portions of dielectric layers in the interconnect stack 210. The etch processes may include, e.g. one or both of a buffered dilute HF etch to remove silicon oxide, and phosphoric acid etch to remove silicon nitride. These and/or other processes familiar to those skilled in the art of MEMs processing may be used to form the cavity 230 extending laterally and vertically between the driving electrodes 235A, 235B and toward the emitter array 205. While various curved dielectric surfaces are shown for illustrative purposes, the extent of the cavity 230 may be determined by the specific nature of the interconnect stack 210 and the wet etch process 615.

Figure 6E:
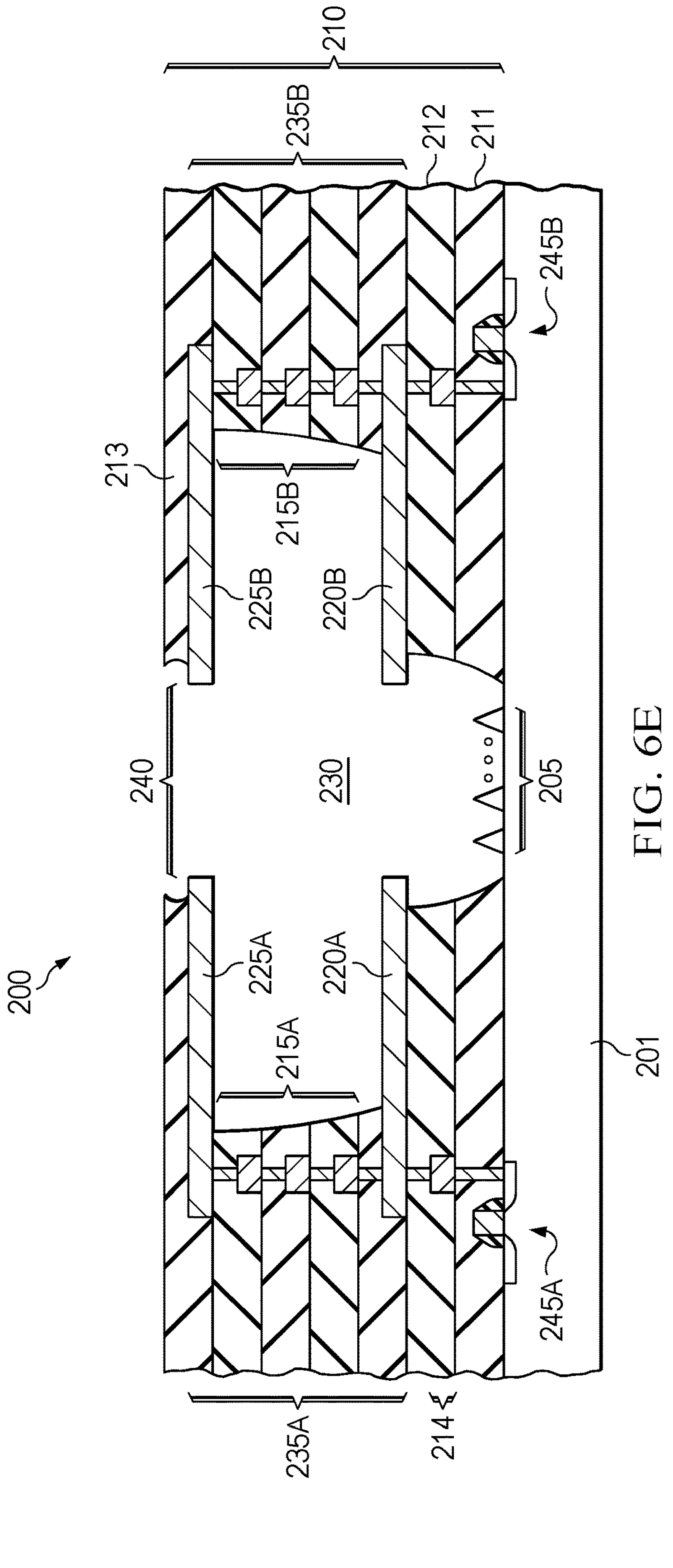

In FIG. 6E the resist layer 605 has been removed, resulting in the completed electronic device 200. In operation, short wavelength photons are expected to be emitted primarily in the plane of electron current flow, e.g. about parallel to a top surface of the substrate 201. Metal and dielectric materials, such as in the interconnect layer 210, may attenuate photon flux to some extent. Thus the photon flux may be greater at the slot 240. In some examples, not explicitly shown, the slot may be extended past the electrodes 225A, 225B to an edge of the substrate 201 to reduce attenuation.

Figure 7:
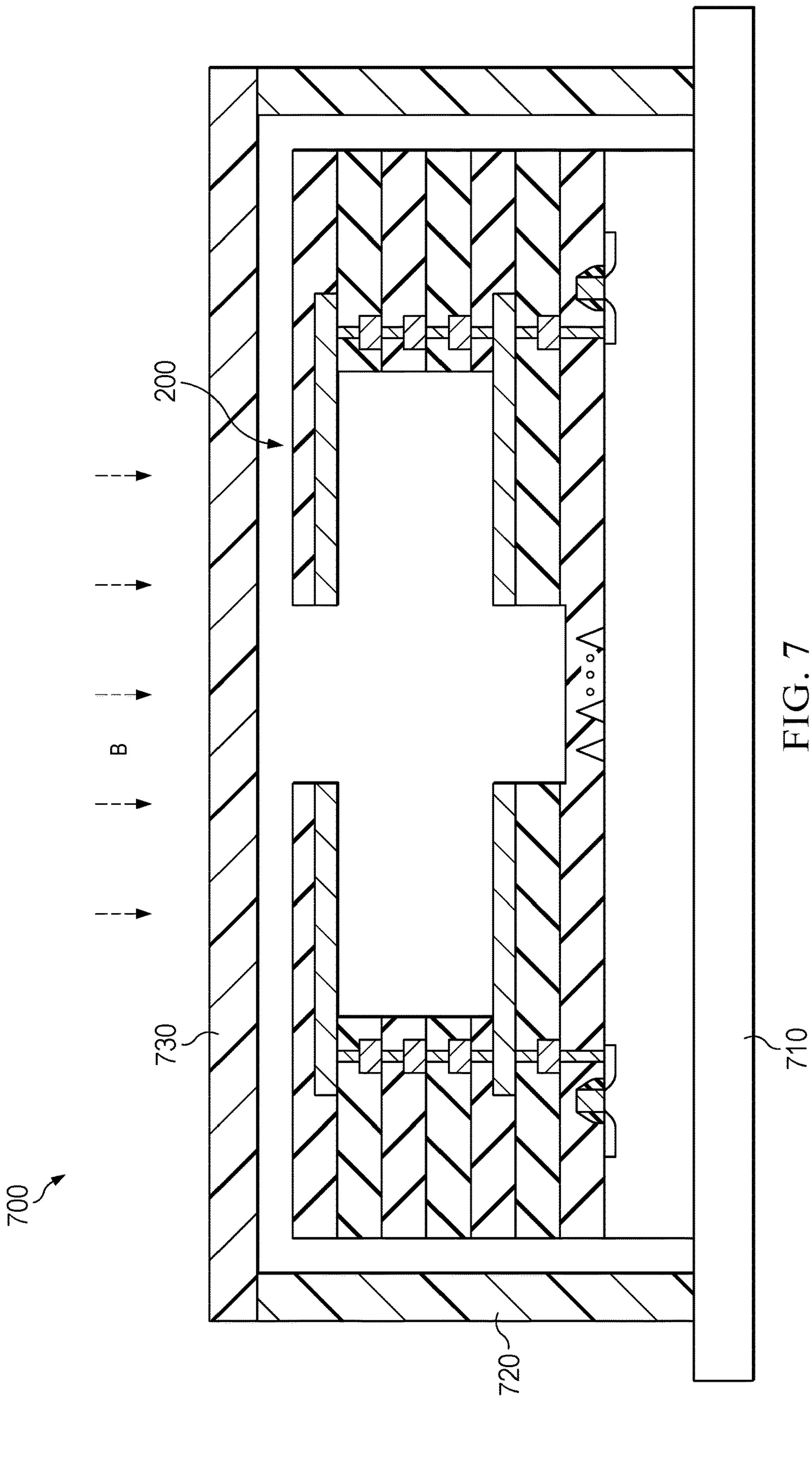
FIG. 7 shows an example packaged miniaturized cyclotron device employing the electronic device of FIG. 2.

FIG. 7 illustrates a packaged miniaturized cyclotron 700 that includes an integrated x-ray source, e.g. the electronic device 200. The electronic device 200 is mounted to a package substrate 710, which may be or include a metallic lead frame portion with unshown connection terminals (e.g. pins) to provide power, ground and any needed drive signals to the electronic device 200. Package walls 720 extend from the package substrate 710 to a package top, or lid, 730. The substrate 710, walls 720 and lid 730 define an enclosed volume that may protect the electronic device 200 from ambient environmental factors, and may further be substantially evacuated to exclude gaseous molecules that could impede the motion of electrons within the cavity 230. A magnetic source (not shown) provides a magnetic field B having sufficient strength to direct electrons produced by the electronic device 200 in a curved or circular path within the cavity 230 consistent with an excitation frequency provided by the driving electrodes 235A, 235B. One or more of the substrate 710, walls 720 and lid 730 may be non-metallic or otherwise substantially transparent to x-rays such that radiation produced during operation of the miniaturized cyclotron 700 may be directed to a desired target, such as biological tissue, crystalline material, or passenger luggage.

Figure 8A:
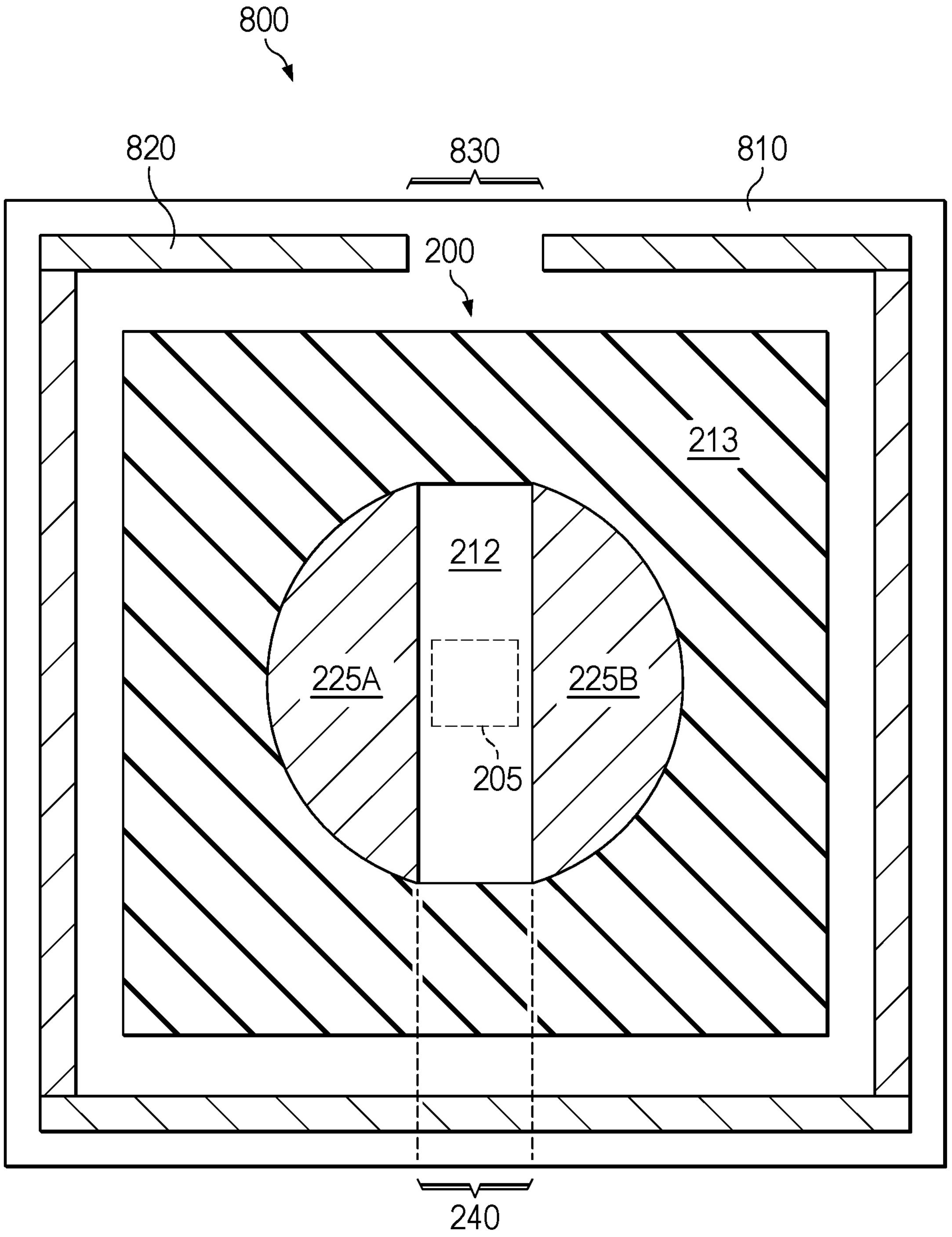
FIG. 8A-8C illustrate various examples of an electronic device such as shown in FIG. 2 attached to a lead frame segment.

FIG. 8A illustrates an example in which shielding may be integrated with the electronic device 200. The electronic device 200 may be mounted on a lead frame segment 810, and shield walls 820 may be mounted to or formed on the lead frame segment 810. The shield walls 820 may completely surround the electronic device 200 except for an aperture 830 through which the photons may be passed with less attenuation. In this manner, a photon beam may be oriented in a desired manner and attenuated in undesired directions, reducing the need for additional shielding in a system in which the electronic device is implemented. The aperture 830 is shown generally aligned with the slot 240 in the illustrated example without implied limitation. Rather, the illustrated configured is representative of other configurations that may be suitable to particular use applications.

The shield walls 820 may be any material suitable for attenuating short wavelength photons, e.g. x-rays, to a greater extent than dielectric materials such as silicon oxide and/or package mold compound. For example, the shield walls 820 may include a dense metal such as lead or tungsten. In the case of lead shield walls 820, the shield walls may be affixed to the lead frame segment 810. In the case of tungsten shield walls 820, the shield walls may be affixed to the lead frame segment 810 or electroplated to the lead frame segment 810.

Figure 8B:
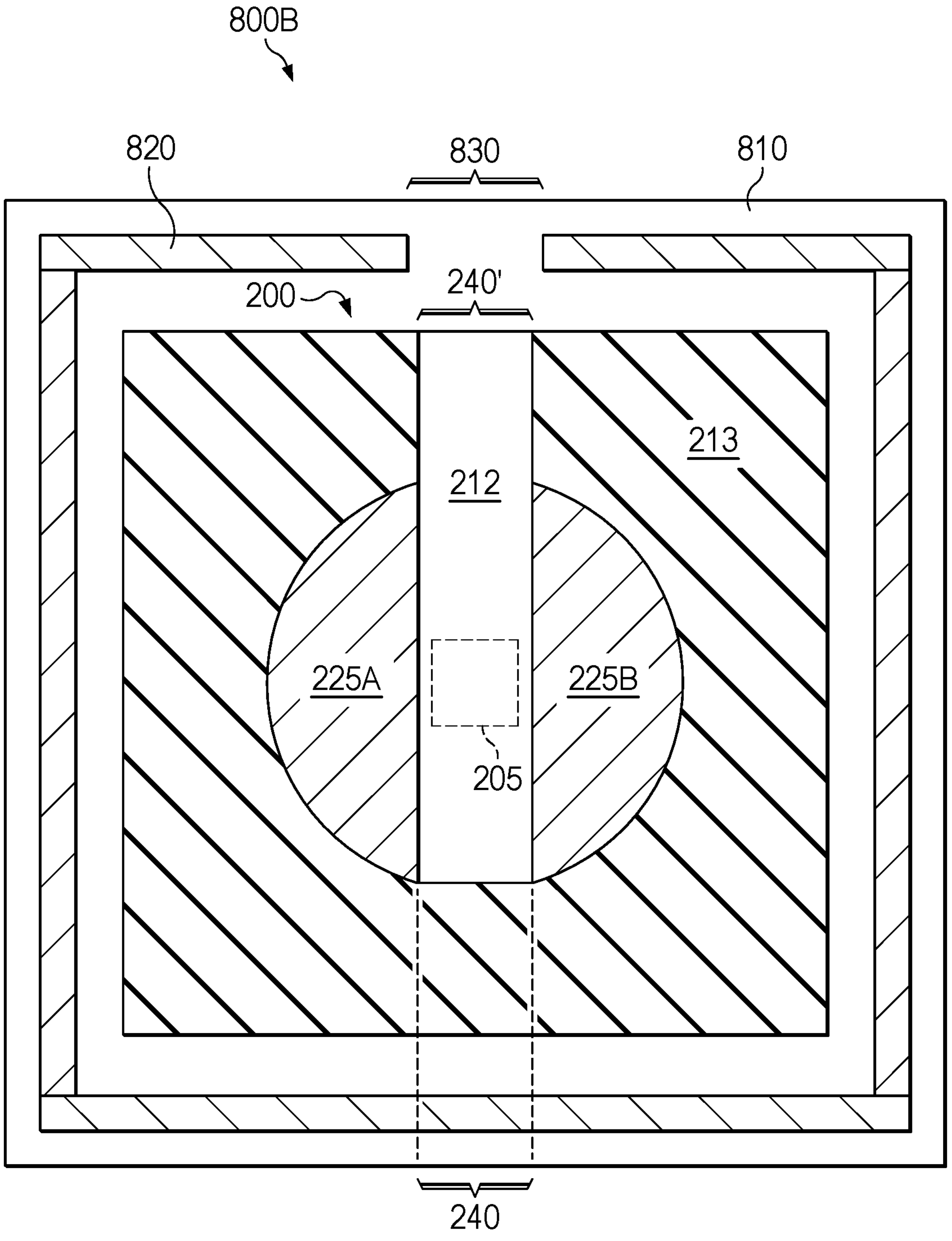
Figure 8C:
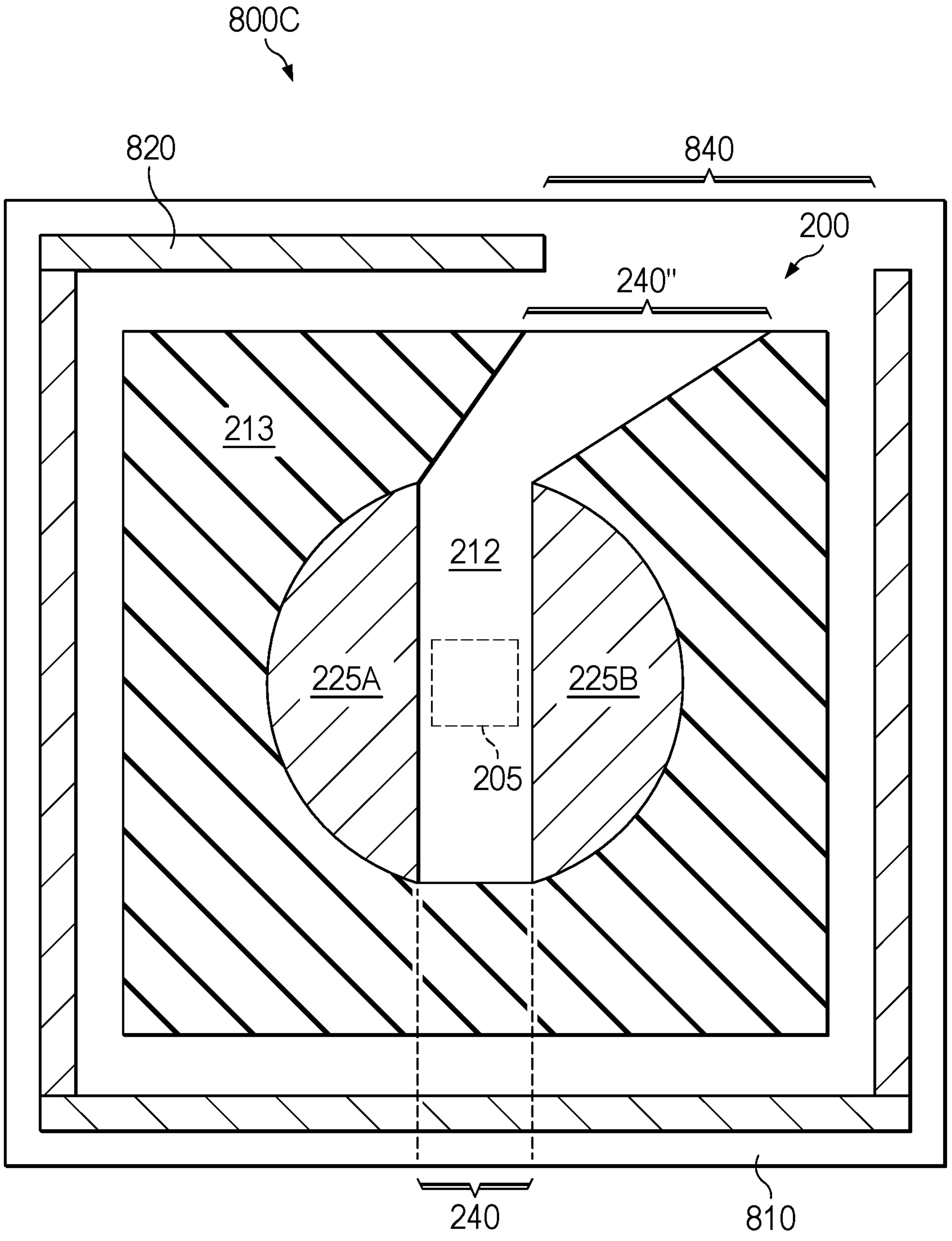

FIG. 8B illustrates another example in which a slot extension 240' extends from the slot 240 to the edge of the substrate 201 such that dielectric layers over the IMD layer 212 are removed. In this way, attenuation that would otherwise result from the presence of those dielectric layers is reduced. FIG. 8C illustrates an example configuration in which an aperture 840 is offset from the parallel sides of the upper resonator electrodes 225A, 225B, and includes a trapezoidal extension 240" to the edge of the substrate 201. The aperture 840 is positioned relative to the parallel sides of the upper resonator electrodes 225A, 225B and to the trapezoidal extension so as to provide a low-attenuation path for a greater flux of photons emerging from the driving electrodes 235A, 235B.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. An electronic device, comprising:

a first resonator electrode in an interconnect stack over a semiconductor substrate, the first resonator electrode including a first lower resonator electrode, a first upper resonator electrode and a first plurality of vias between the first lower resonator electrode and the first upper resonator electrode;

a second resonator electrode in the interconnect stack, the second resonator electrode including a second lower resonator electrode, a second upper resonator electrode, and a second plurality of vias between the second lower resonator electrode and the second upper resonator electrode;

a cavity in the interconnect stack bounded by the first resonator electrode and the second resonator electrode; and an electron emitter extending from the semiconductor substrate between the first and second resonator electrodes and configured to direct electrons into the cavity.

2. The electronic device of claim 1, further comprising a magnetic field source configured to apply a magnetic field to the cavity that has a component normal to a top surface of the semiconductor substrate.

3. The electronic device of claim 1, wherein the first upper resonator electrode and the second upper resonator electrode are spaced apart by a slot that overlies the electron emitter.

4. The electronic device of claim 3, wherein the slot extends to an edge of the semiconductor substrate.

5. The electronic device of claim 3, wherein the first upper resonator electrode and the first lower resonator electrode have a same lateral profile.

6. The electronic device of claim 1, wherein the electron emitter is one of a plurality of electron emitters arranged in an array.

7. The electronic device of claim 1, wherein the electron emitter includes a portion of the semiconductor substrate that extends above a top surface of the semiconductor substrate to an emitter point.

8. The electronic device of claim 7, further comprising an emitter cathode electrode surrounding the emitter point.

9. The electronic device of claim 8, wherein the emitter cathode electrode is formed in a polysilicon layer.

10. The electronic device of claim 1, wherein the semiconductor substrate is located within an evacuated package.

11. The electronic device of claim 1, wherein the cavity has a diameter in a range from about 0.5 mm to about 5 mm.

12. The electronic device of claim 1, wherein the semiconductor substrate is attached to a lead frame segment, and at least partially surrounded by a metallic shield wall.

13. The electronic device of claim 12, wherein an aperture in the metallic shield wall is offset from parallel sides of the first and second resonator electrodes.

14. A method of forming an electronic device, comprising:

forming a first resonator electrode in an interconnect stack over a semiconductor substrate, the first resonator electrode including a first lower resonator electrode, a first upper resonator electrode and a first plurality of vias between the first lower resonator electrode and the first upper resonator electrode;

forming a second resonator electrode in the interconnect stack, the second resonator electrode including a second lower resonator electrode, a second upper resonator electrode, and a second plurality of vias between the second lower resonator electrode and the second upper resonator electrode;

forming a cavity in the interconnect stack bounded by the first resonator electrode and the second resonator electrode; and forming an electron emitter extending from the semiconductor substrate between the first and second resonator electrodes and configured to direct electrons into the cavity.

15. The method of claim 14, further comprising configuring a magnetic field source to apply a magnetic field to the cavity that has a component normal to a top surface of the semiconductor substrate.

16. The method of claim 14, wherein the first upper resonator electrode and the second upper resonator electrode are spaced apart by a slot that overlies the electron emitter.

17. The method of claim 16, wherein the first upper resonator electrode and the first lower resonator electrode have a same lateral profile.

18. The method of claim 14, wherein the electron emitter is one of a plurality of electron emitters arranged in an array.

19. The method of claim 14, wherein the electron emitter includes a portion of the semiconductor substrate that extends above a top surface of the semiconductor substrate to an emitter point.

20. The method of claim 19, further comprising forming an emitter cathode electrode surrounding the emitter point.

21. The method of claim 20, wherein the emitter cathode electrode is formed in a polysilicon layer.

22. The method of claim 14, wherein the semiconductor substrate is located within an evacuated package.

23. The method of claim 14, wherein the cavity has a diameter in a range from about 0.5 mm to about 5 mm.

* * * * *